US010178066B1

(12) United States Patent
Britt et al.

(10) Patent No.: US 10,178,066 B1
(45) Date of Patent: *Jan. 8, 2019

(54) USER-CONFIGURABLE DYNAMIC DNS MAPPING FOR VIRTUAL SERVICES

(71) Applicant: 8x8, Inc., San Jose, CA (US)

(72) Inventors: Timothy Britt, San Jose, CA (US); Bryan Martin, San Jose, CA (US); Christopher Peters, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,259

(22) Filed: Apr. 18, 2017

Related U.S. Application Data

(63) Continuation of application No. 14/521,717, filed on Oct. 23, 2014, now Pat. No. 9,628,436.

(Continued)

(51) Int. Cl.
*H04L 29/06* (2006.01)
*G06F 15/173* (2006.01)
(Continued)

(52) U.S. Cl.
CPC .......... *H04L 61/1511* (2013.01); *H04L 41/22* (2013.01); *H04L 61/6018* (2013.01)

(58) Field of Classification Search
CPC ..................... H04L 61/1511; H04L 29/12066
(Continued)

(56) References Cited

U.S. PATENT DOCUMENTS 7,188,163 B2 * 3/2007 Srinivasan .......... G06F 9/44505
709/220
7,289,491 B2 10/2007 Singh
(Continued)

FOREIGN PATENT DOCUMENTS

WO 1996042041 A2 12/1996

OTHER PUBLICATIONS

"Server Configuration Guide ESX Server 3.0.1 and Virtual Center 2.0.1"—VM Ware, Apr. 7, 2009 https://www.vmware.com/pdf/vi3_301_201_server_config.pdf (Year: 2009).*

(Continued)

*Primary Examiner* — Randy A Scott
(74) *Attorney, Agent, or Firm* — Crawford Maunu PLLC

(57) ABSTRACT

Various example implementations are directed to circuits, apparatuses, and methods for providing virtual computing services. According to an example embodiment, an apparatus includes a computing server configured to provide a respective group of virtual servers for each of a plurality of accounts. Each of the accounts has a respective set of domain names and a respective settings file. The apparatus also includes a domain name server (DNS). The DNS is configured and arranged to dynamically map a respective set of domain names for each account to network addresses of the respective group of virtual servers, provided for the account. The DNS performs the mapping according to a mapping function indicated in the respective settings file of the account. The respective settings file of a first account accounts includes a mapping function that is different from a mapping function included in the respective settings file of a second account.

16 Claims, 3 Drawing Sheets

Related U.S. Application Data

(60) Provisional application No. 61/983,792, filed on Apr. 24, 2014, provisional application No. 61/975,314, filed on Apr. 4, 2014.

(51) Int. Cl.
  *G06F 15/16* (2006.01)
  *H04L 29/12* (2006.01)
  *H04L 12/24* (2006.01)

(58) Field of Classification Search
  USPC ........ 709/202, 217, 220, 221, 223; 370/235, 370/236, 401
  See application file for complete search history.

(56) References Cited

U.S. PATENT DOCUMENTS

| | | | |
|---|---|---|---|
| 8,204,206 B2 | 6/2012 | Townsend | |
| 9,015,318 B1 | 4/2015 | Batz et al. | |
| 9,300,623 B1 | 3/2016 | Earl et al. | |
| 2001/0049741 A1* | 12/2001 | Skene | G06F 9/505 709/232 |
| 2002/0184575 A1 | 12/2002 | Landan | |
| 2004/0162781 A1 | 8/2004 | Searl et al. | |
| 2009/0144413 A1 | 6/2009 | Khan et al. | |
| 2011/0153868 A1 | 6/2011 | Castleberry et al. | |
| 2011/0154457 A1* | 6/2011 | Hamada | H04L 29/12066 726/6 |
| 2012/0233329 A1* | 9/2012 | Dickinson | H04L 67/2814 709/226 |
| 2014/0047107 A1* | 2/2014 | Maturana | H04L 43/04 709/224 |
| 2014/0344326 A1 | 11/2014 | Kamath et al. | |
| 2015/0009831 A1* | 1/2015 | Graf | H04L 47/31 370/236 |

OTHER PUBLICATIONS

International Telecommunications Union, Series P: Telephone Transmission Quality, Telephone Installations, Local Line Networks, ITU-T Recommendation P.862, "Perceptual evaluation of speech quality (PESQ): An objective method for end-to-end speech quality assessment of narrow-band telephone networks and speech codecs," Feb. 2001.

Radvision, "Back-to-Back User Agent (B2BUA) SIP Servers Powering Next Generation Networks: A Functional and Architectural Look At Back-to-Back User Agent (B2BUA) SIP Servers," 2007.

Rose et al. "Secure Domain Name System Deployment Guide." NIST, Jul. 2013.

\* cited by examiner

USER-CONFIGURABLE DYNAMIC DNS
MAPPING FOR VIRTUAL SERVICES

RELATED DOCUMENTS

This patent document is a continuation under 35 U.S.C. § 120 of U.S. patent application Ser. No. 14/521,717 filed on Oct. 23, 2014 (U.S. Pat. No. 9,628,436), which claims the benefit under 35 U.S.C. § 119(e) of U.S. Provisional Patent Application Ser. No. 61/975,314 filed on Apr. 4, 2014, and entitled "USER-CONFIGURABLE DYNAMIC DNS MAPPING FOR VIRTUAL SERVICES," and of U.S. Provisional Patent Application Ser. No. 61/983,792 filed on Apr. 24, 2014, and entitled "APPARATUS AND METHOD FOR TRACKING AND BILLING FOR VIRTUAL SERVICES," which are fully incorporated herein by reference.

OVERVIEW

Computing servers are increasingly being used to provide various services over a network including, but not limited to, website hosting, remote data storage, remote computing services, virtual computing environments, and communication services such as voice-over-IP (VoIP), video conferencing, call exchange servers, and packet switching, and traffic management. For ease of reference, the various applications, systems and services that may be provided by computing servers may be collectively referred to as remote services.

SUMMARY

Various example implementations are directed to circuits, apparatuses, and methods for providing virtual computing services. According to an example embodiment, an apparatus includes at least one computing server configured and arranged to provide a respective group of virtual servers for each of a plurality of accounts. Each of the accounts has a respective set of domain names and a respective settings file. For at least one of the accounts, the groups of virtual servers are configured to provide one or more VoIP services. The apparatus also includes a domain name server (DNS). The DNS is configured and arranged to dynamically map a respective set of domain names for each account to network addresses of the respective group of virtual servers, provided for the account. The DNS performs the mapping according to a mapping function indicated in the respective settings file of the account. The respective settings file of a first account includes a mapping function that is different from a mapping function included in the respective settings file of a second account.

According to another example embodiment, a method is provided. A respective group of virtual servers are provided for each of a plurality of accounts. Each of the accounts has a respective set of domain names and a respective settings file. For each account, the respective set of domain names are dynamically mapped to network addresses of the respective group of virtual servers provided for the account according to a mapping function indicated in the respective settings file of the account. The respective settings file of a first account includes a mapping function that is different from a mapping function included in the respective settings file of a second account.

According to another example embodiment, an apparatus includes a first processing means for providing a respective group of virtual servers for each of a plurality of accounts. Each of the accounts has a respective set of domain names and a respective settings file. The apparatus also includes a second processing means for dynamically mapping a respective set of domain names for each account to network addresses of the respective group of virtual servers provided for the account. The second processing means performs the dynamic mapping according to a mapping function indicated in the respective settings file of the account. The respective settings file of a first account includes a mapping function that is different from a mapping function included in the respective settings file of a second account.

BRIEF DESCRIPTION OF THE DRAWINGS

The disclosure may be more completely understood in consideration of the following detailed description of various embodiments of the disclosure in connection with the accompanying drawings, in which.

Figure 1:
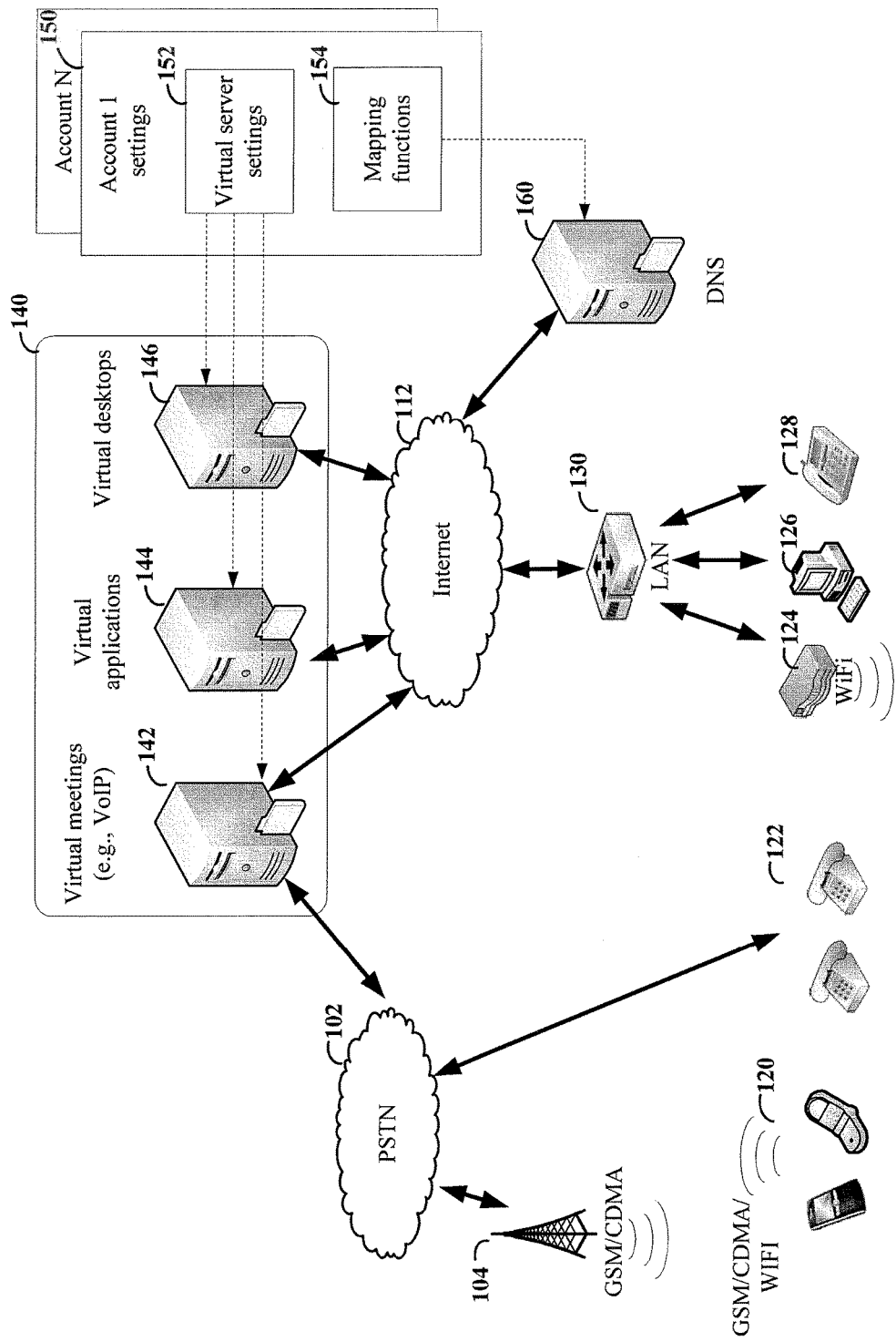
FIG. 1 shows an example network architecture having a set of servers configured to provide virtual services for a plurality of accounts.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DESCRIPTION

Aspects of the present disclosure are believed to be applicable to a variety of different types of apparatuses, systems, and methods involving computing servers. Various example implementations are directed to circuits, apparatuses, and methods for providing a respective group of virtual servers/services for each of a plurality of accounts. More specifically, the group of the virtual servers provided for an account may be accessed by authorized end-users using one or more respective domain names associated with the client account. The group of virtual servers for each account may be configured to provide various remote services including, for example, file servers, email servers, web hosting, virtual meeting services (e.g., VoIP), billing, and/or remote computing services (e.g., virtual desktops, virtual private servers, and/or virtual enterprise services). While the disclosed embodiments are not necessarily limited to such applications, various aspects of the present disclosure may be appreciated through a discussion of various examples in this context.

In one or more implementations, an apparatus includes one or more computing servers configured to provide a respective group of virtual servers/services for each of a plurality of accounts. The apparatus also includes a user-configurable domain name server (DNS), which is configured to dynamically map each domain name associated with one of the accounts to an IP address of a selected one of the group of virtual servers of the account. The DNS performs the mapping of the domain name associated with an account according to a mapping function indicated in a settings file of the account.

For each account, the mapping function may map domain names to IP addresses of the virtual servers using various mapping criteria. For example, in some implementations, the mapping function may cause the DNS to map domain names based on the operating status of the virtual servers. For instance, the mapping function may map a domain name to a first virtual server while the first virtual server is operating correctly. In response to the first server going down, the mapping function may map the domain name to a backup virtual server. As another example, the mapping function may cause the DNS to map domain names based on a processing load of the virtual servers. For instance, domain names may be mapped to balance the processing load between a plurality of virtual servers. For example, the virtual servers provided for an account may be configured to provide one or more VoIP based services. The mapping function for the account may be configured to balance VoIP traffic evenly across the virtual servers for the account. In some implementations, the mapping function may cause the DNS to map domain names based on a geographical location of the user submitting a domain name query to the DNS.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective mapping function may be used for each account. This allows the mapping of domain names to be customized for the particular needs and services of each account. In some implementations, the apparatus is further configured to provide a web-based graphical user interface (GUI) configured and arranged to allow one or more authorized users of the account to adjust the mapping criteria indicated in the settings file. An authorized user may specify a single mapping function for all virtual servers associated with the account or may specify different mapping functions for different types of virtual servers or for different virtual servers of the same type. Further, an authorized user may specify different mapping functions for different departments or users associated an account.

Turning now to the figures, FIG. 1 shows a communication network including a plurality of computing servers 140 configured to provide virtual servers, for a plurality of accounts, to various end-point devices including, for example, mobile devices 120, plain-old telephones (POTS) 122, computer(s) 126, and IP phones 128. In this example, for each account, the computing servers 140 provide virtual servers indicated in virtual server settings 152 of an account settings file 150 for the account.

In this example, the computing servers 140 include a first server 142 configured to provide virtual meeting services (e.g., via VoIP), a second server 144 configured to provide virtual application services, and a third server 146 configured to provide virtual desktop services. The application servers may be, for example, virtual private servers or enterprise servers. Data transactions related to the remote services provided by the computing servers 140 are communicated between the computing servers and the remote users over various data networks including, for example, the Internet 112, public service telephone networks (PSTN) 102, wireless networks 104 (e.g., GSM, CDMA, or LTE), and private data networks, including, but not limited to LAN 130, WiFi network 124, and/or Private Branch Exchange servers (not shown).

In this example, a DNS 160 is configured to map domain names associated with each account to IP addresses of the virtual servers for the account provided by the computing servers 140. The mapping of the domain names of the account is performed according to one or more mapping functions 154 included in a settings file for the account.

Figure 2:
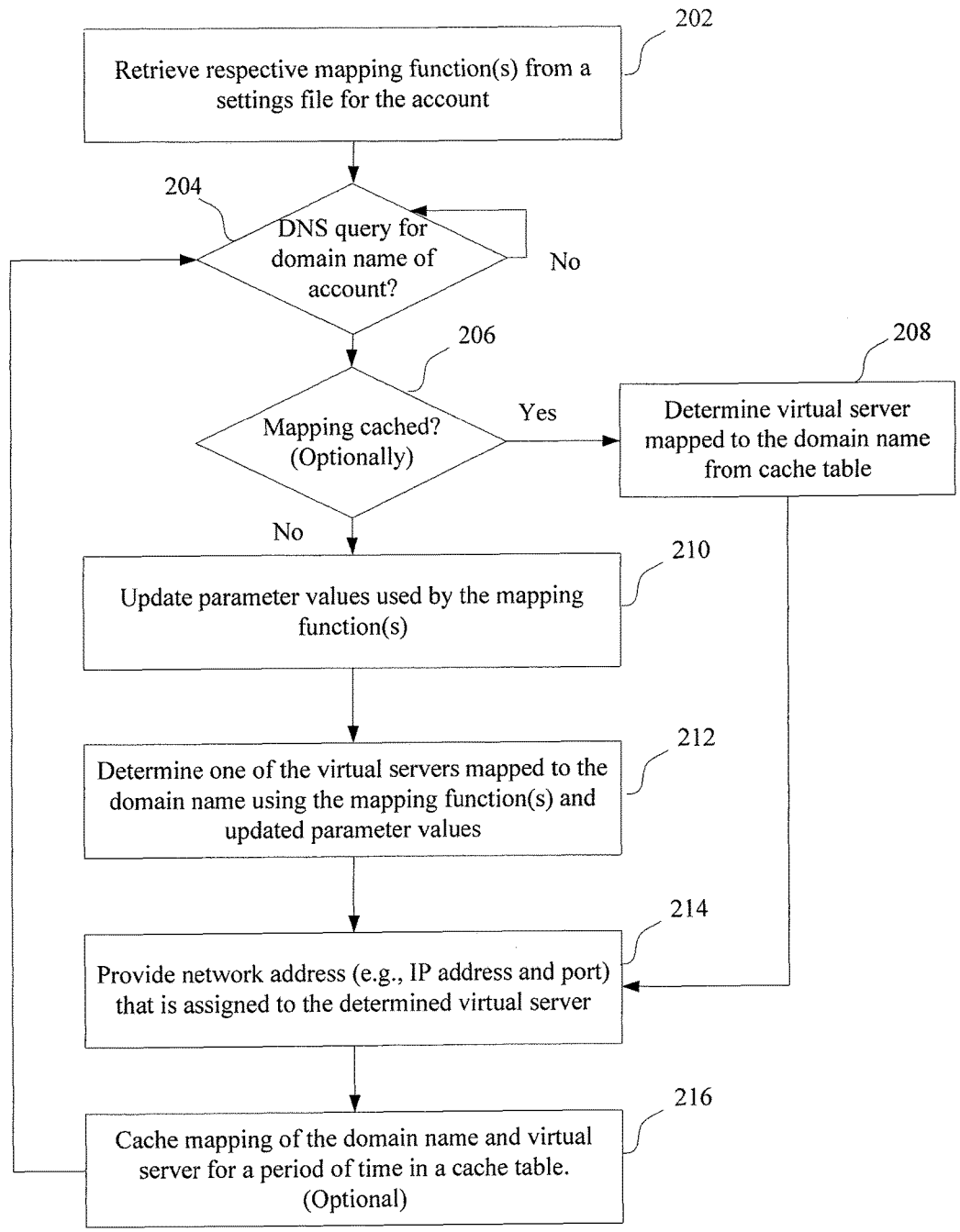
FIG. 2 shows a process for dynamic mapping of domain names, in accordance with one or more embodiments.

FIG. 2 shows an example process for dynamic mapping of a set of domain names for an account, in accordance with one or more embodiments. At block 202, one or more respective mapping functions are retrieved (e.g., from a respective settings file for the account). The process waits at decision block 204, until a DNS query is received for one of the domain names of the account. In response to a DNS query for one of the domain names of the account, the process checks to see if a mapping for the domain name is cached from a recent DNS query. If so, decision block 206 causes the process to determine the virtual server of the account that is mapped to the domain name from a cache table at block 208.

Otherwise, decision block 206 directs the process to block 210. At block 210, the process updates parameter values used by the mapping function(s) of the account. The parameters may include for example, operating status of the virtual servers, processing load of the virtual servers, load distribution, geographic location of the user that submitted the DNS query, time of the DNS query, etc. At block 212, a virtual server of the account that is mapped to the domain name is dynamically determined using the mapping function(s) and the updated parameters.

After determining a virtual server mapped to the domain name at block 208 or 212, a network address of the determined virtual server is provided, at block 214, to the user that submitted the DNS query. After providing the network address to the user the process returns to decision block 204 and waits for another DNS query. Optionally, prior to returning to decision block 204, a mapping of the domain name and virtual server may be cached, at block 216, for a period of time in a cache table.

Figure 3:
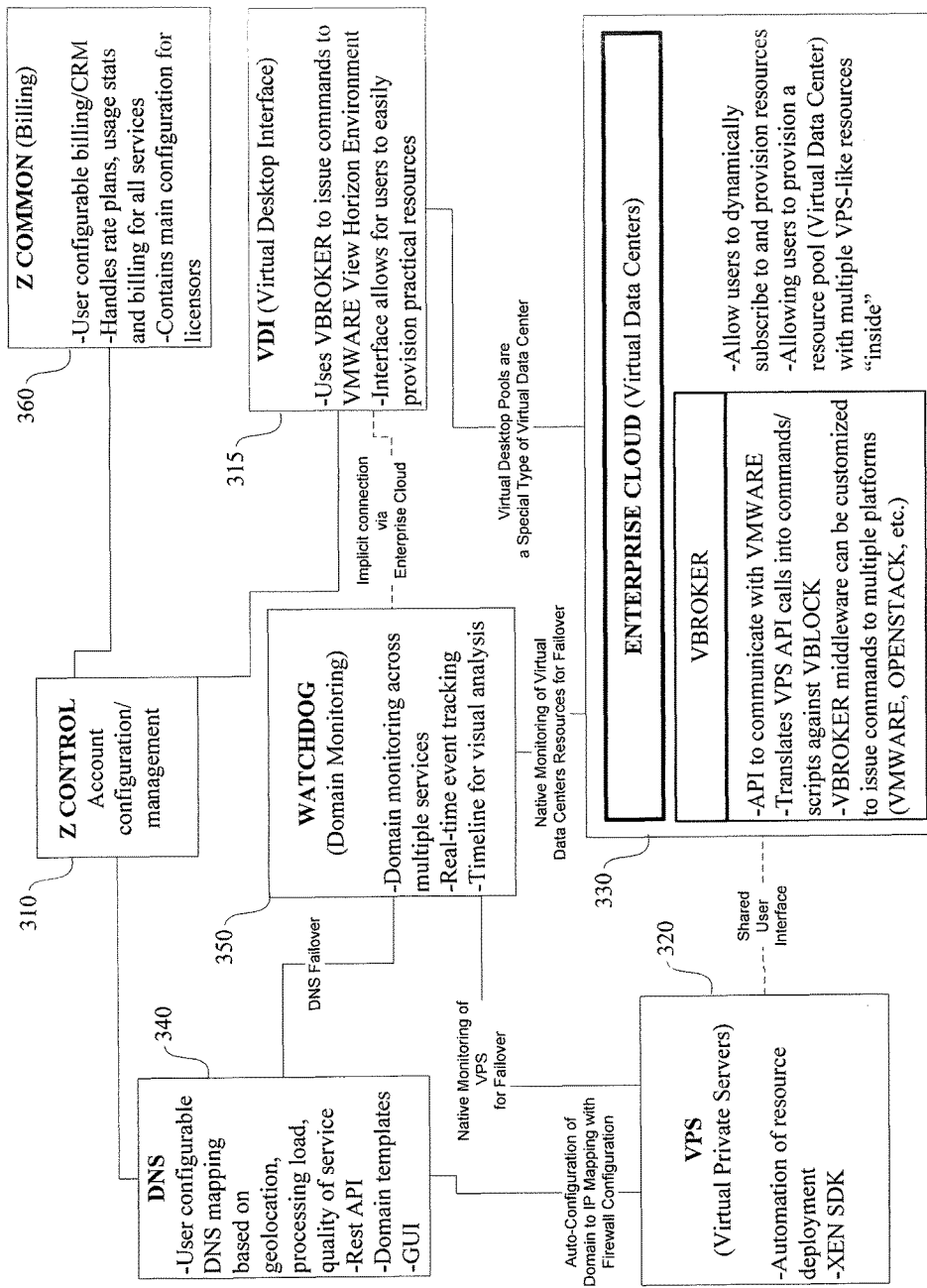
FIG. 3 shows a block diagram of an example system configured to provide respective groups of virtual services for a number of accounts, with user configurable domain name mapping for each account.

FIG. 3 shows a block diagram of an example system configured to provide respective groups of virtual services for a number of accounts, and provide customizable billing for each account. FIG. 3 shows various subsystems included in the example system (Z_system). The system includes multiple subsystems configured to provide respective virtual servers/services for various user accounts. For example, the system includes a first subsystem virtual desktop interface (VDI) 315, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision virtual resources. In some implementations, the VDI subsystem 315 uses a subsystem VBROKER to issue commands to VMWARE View Horizon Environment. VBROKER is a full VMWARE view software development kit (SDK) that provides the ability to run custom Windows Powershell scripts against a VMWARE View Horizon server in order to create, manage and synchronize information about desktop pool resources of the system. VBROKER may also be applicable to other subsystems shown in FIG. 3, as well as various other applications utilizing VMWARE.

The system also includes a second subsystem Virtual Private Servers (VPS 320), which can be configured to virtualize various servers for an account. In some implementations, the VPS subsystem 320 automates deployment of resources allocated for an account. For instance, the VPS may provide various virtual servers/services including, but not limited to, file servers, email servers, web hosting, and virtual meeting services (e.g., VoIP), etc. In some scenarios, the VPS may be accessible by virtual desktops (via VDI), by external computers (via the internet), or both. In some implementations, the virtual servers/services provided by the VPS system 320 may be configured using a SDK such as XEN. The SDK may be used, for example, to customize and/or maintain virtual services provided by the VPS system for an account.

The system shown in FIG. 3 also includes a third subsystem (Enterprise Cloud) 330 that is configured to provide virtual data centers for an account. The Enterprise Cloud subsystem 330 allows users to dynamically subscribe to provision resources (e.g., virtual servers/services). Users may create a virtual data center having a pool of resources, which may include a number of VPS-like servers/services. For each account, a respective virtual data center provided by the Enterprise Cloud 330 may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center provided by the Enterprise Cloud 330 may include a firewall between a network and the virtual data center. Additionally or alternatively the virtual data center may include firewalls to protect individual virtual servers/desktops in the virtual data center.

In some implementations, a virtual data center provided by the Enterprise Cloud 330 for an account includes a group of virtual desktops and/or virtual servers indicated in respective settings files for the account. The virtual desktops and/or virtual servers in the virtual data center may be provided by the VDI and VPS subsystems 315 and 320 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VoIP), billing, and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, computing servers of the Enterprise Cloud 330 emulate the virtual data center by emulating the virtual desktops and/or virtual servers indicated in the server settings, and also emulating the virtual connections specified in the data center configuration settings. In some implementations, emulation of the virtual data centers in the Enterprise Cloud 330 includes execution of a resource management process, configured to assign computing resources allocated for the virtual data center for emulation of the virtual desktops, virtual servers, and connections of the virtual data center.

In some implementations, a virtual data center provides a perimeter firewall between an internal network of the virtual data center and an external network. The perimeter firewall may provide network protection for the virtual data center with stateful packet inspection, access-control lists, network address translation (NAT), and virtual private network (VPN) connections. In some implementations, the virtual data center may also include individual firewalls isolating one or more virtual servers/desktops from other virtual servers/desktops in the virtual data center. In some implementations a web-based GUI is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 330 uses VBROKER to issue commands to VMWARE hosting the virtual servers/desktops. VBROKER provides an application program interface (API) to communicate with VMWARE. For example, VBROKER may translate VPS API calls into commands/scripts against VBLOCK. VBROKER may be used as middleware to issue commands to various platforms (e.g., VMWARE or OPENSTACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the virtual data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the virtual data center. The GUI may also provide a mechanism to import and/or replicate virtual machines in the virtual data center. In some implementations, the GUI may provide the ability to save a backup or snapshot of the layout and configuration of the virtual data center.

The system shown in FIG. 3 also includes a domain name server (DNS) subsystem 340. The DNS subsystem 340 is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 340 performs the mapping of the domain name associated with an account according to a respective set of mapping criteria indicated in a settings file of the account. For each account, the DNS subsystem 340 may map domain names to IP addresses of the virtual servers according to various mapping criteria. For example, in some implementations, the mapping criteria may cause the DNS subsystem 340 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 340 to map domain names based on processing load of the virtual servers. For instance, domain names may be mapped to balance the processing load between a plurality of virtual servers. In some implementations, the mapping criteria may cause the DNS subsystem 340 to map domain names based on the geographical location of the user submitting a domain name query to the DNS subsystem 340.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 340 provides a representational state transfer (REST) API for configuration of DNS mapping for an account. In some implementations domain templates, having various preconfigured mapping criteria, may be provided for easy configuration of the DNS subsystem 340 for an account. In some implementations, the DNS subsystem 340 auto-configures mapping based on virtual services provided for the account by the other subsystems (e.g., 315, 320 and/or 330).

In some implementations, the DNS subsystem 340 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated with the account.

In this example, the system also includes a fourth subsystem (Watchdog) 350 configured to monitor status of the virtual servers/services provided for the various accounts. The Watchdog subsystem 350 is configured to determine the operating status of the virtual servers/services provided for each account. For instance, Watchdog subsystem 350 may be configured to monitor services provided by the other subsystems (e.g., 315, 320 and/or 330) for fall over. Watchdog subsystem 350 may provide domain monitoring across multiple services. The Watchdog subsystem 350 may provide real-time event tracking for the services for each account.

In some implementations, the Watchdog subsystem 350 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 350 may be configured to provide an alert to one or more authorized users of the account if the operating status of the virtual servers/services satisfies alert criteria indicated in an alert policy for the account. The Watchdog subsystem 350 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 340 is configured to map domain names to the virtual servers/services based on the operating statuses of the virtual servers/services, as determined by the Watchdog subsystem 350. For example, the DNS subsystem may be configured to remap a domain name from a first virtual server to a backup virtual server in response to the first virtual server becoming unresponsive.

The system shown in FIG. 3 also includes a subsystem (Z Common) 360 configured to provide billing for various services provided for an account. The subsystem handles rate plans, usage statistics, and billings for various services of the system. The Z Common subsystem 360 may bill services using flat rates for specified time-periods (e.g., a monthly rate), or using usage rates indicating a specified billing rate for a specified amount of use (e.g., time, amount of data, and/or number of users). The Z Common subsystem 360 is configurable as a plug-and-play component to provide billing services for various independent systems. In some implementations, a GUI is provided for authorized users to manage services, billing options, payment options, account specific alerts, and/or various administrated options. In some implementations, the GUI provides an interface for a user to configure subscription and billing.

The system includes a subsystem (Z Control) 310, which configures settings of one or more of the subsystems for respective accounts of the system. In some implementations, the Z Control subsystem 310 stores data indicating services, provided by the various subsystems (e.g., 315, 320, 330, 340, and/or 350), which are subscribed to for each account. The Z Control subsystem 310 may further store user-configurable settings for the subscribed to services for each respective account. For example, the settings for an account may indicate settings for one or more virtual servers provided for the account by the VPS subsystem 320. In some implementations, the Z Control subsystem 310 may provide a GUI for authorized users of an account to manage virtual services subscriptions, and/or various administrated options.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIGS. 1 and 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. An apparatus, comprising:
at least one computing server configured and arranged to provide a respective group of virtual servers for each of a plurality of accounts, each of the plurality of accounts having a respective set of domain names and a respective settings file; and
a domain name server (DNS) configured and arranged to, for each respective account, dynamically map domain names of the respective set of domain names to network addresses of the respective group of virtual servers, according to a mapping function indicated in the respective settings file of the account, wherein the respective settings file of a first one of the plurality of accounts includes a first mapping function that is different from a second mapping function included in the respective settings file of a second one of the plurality of accounts, wherein the first mapping function is for a first type of virtual server and the second mapping function is for a second type of virtual server.

2. The apparatus of claim 1, wherein the mapping function indicated in the respective settings file of the account is shared for the group of virtual servers associated with the account, and causes the DNS to balance traffic across the group of virtual servers for the account.

3. The apparatus of claim 1, wherein the respective settings file of the account includes a different respective mapping function for each of a plurality of departments or users associated with the account.

4. The apparatus of claim 1, including:
a processing circuit configured and arranged to monitor the virtual servers provided for at least one of the plurality of accounts and provide a set of parameters of the monitored virtual servers to the DNS; and
wherein for at least one of the plurality of accounts, the mapping function in the settings file for the account maps at least one domain name to one of the group of virtual servers based on the set of parameters of the virtual server and the group of virtual servers are configured and arranged to provide Voice-over-IP (VoIP) based services.

5. The apparatus of claim 4, wherein the set of parameters include at least two of: an operating status of the virtual servers, a processing load of the virtual servers, network traffic conditions, quality of service requirements, geographical location of an end-user, permissions of an end-user, date or time of a query, a type of virtual server associated with the domain name, and/or a number of servers associated with the domain name.

6. The apparatus of claim 1, including:
a processing circuit configured and arranged to provide a respective virtual data center for each of the respective accounts, wherein for each virtual data center, the respective virtual servers are interconnected according to data center configuration settings included in the respective settings file for the account.

7. The apparatus of claim 4, wherein the mapping function for the account includes instructions to map a domain name to a first virtual server under normal operating states, and map the domain name to a second virtual server in response to a determination that the first virtual server is unavailable.

8. The apparatus of claim 1, further comprising a web accessible graphical user interface configured and arranged to, for each of the plurality of accounts, allow an authorized user indicated in the settings file of the account to modify the mapping function.

9. The apparatus of claim 1, wherein for each virtual server in the respective group of virtual servers, the network addresses includes
an IP address of the at least one computing server that provides the virtual server, and
a port number of computing server assigned to the virtual server.

10. A method, comprising:
providing a respective group of virtual servers for each of a plurality of accounts, each of the accounts having a respective set of domain names and a respective settings file;
providing domain templates for each of the plurality of accounts, each domain template including preconfigured mapping criteria that are editable by authorized users of the respective accounts; and
dynamically mapping domain names of the respective set of domain names of each account to network addresses of the respective group of virtual servers provided for the account according to a mapping function indicated in the respective settings file of the account and at least one parameter associated with the respective group of virtual servers.

11. The method of claim 10, wherein the parameter is one of: an operating status of the virtual servers, a processing load of the virtual servers, network traffic conditions, quality of service requirements, geographical location of an end-user, permissions of an end-user, date or time of a query, a type of virtual server associated with the domain name, and/or a number of servers associated with the domain name.

12. The method of claim 10, including determining at least one parameter relating to the respective group of virtual servers, and remapping a domain name previously mapped to a first virtual server to a second virtual server based on the determined parameter.

13. The method of claim 12, wherein for at least one of the plurality of accounts, the remapping of the domain name based on the determined parameter includes remapping the domain name to the second virtual server based on a processing load of first or second virtual server.

14. The method of claim 10, wherein the respective settings file of a first one of the plurality of accounts includes a mapping function that is different from a mapping function included in the respective settings file of a second one of the plurality of accounts.

15. The method of claim 10, further including providing an alert to one or more authorized users of the account responsive to an operating status of one of the virtual servers satisfying a criteria indicated in an alert policy of the account.

16. The method of claim 10, wherein dynamically mapping domain names of the respective set of domain names of each account to network addresses of the respective group of virtual servers provided for the account according to the mapping function includes causing domain name server (DNS) to balance traffic across the group of virtual servers for the account.

* * * * *